(12) United States Patent
Wu

(10) Patent No.: US 7,305,858 B1
(45) Date of Patent: Dec. 11, 2007

(54) SECURITY BOX

(76) Inventor: Chun-hsien Wu, No. 717, Sec. 1, An Zhong Rd., Tainan (TW)

( * ) Notice: Subject to any disclaimer, the term of this patent is extended or adjusted under 35 U.S.C. 154(b) by 0 days.

(21) Appl. No.: 11/552,687

(22) Filed: Oct. 25, 2006

(30) Foreign Application Priority Data

Aug. 31, 2006 (TW) ................ 95215402 U

(51) Int. Cl.
*E05B 65/52* (2006.01)
(52) U.S. Cl. .......... 70/58; 70/63; 70/164; 70/170; 109/47; 109/52
(58) Field of Classification Search .......... 70/14, 70/18, 30, 49, 57, 58, 63, 233, 158–173; 109/23, 24, 47, 50–52, 57; 248/551–553; 220/210, 324, 345.1, 345.2, 345.4, 351
See application file for complete search history.

(56) References Cited

U.S. PATENT DOCUMENTS

| 2,755,748 | A | * | 7/1956 | Abell, Jr. ...................... 109/52 |
| 3,782,761 | A | * | 1/1974 | Cardin, Sr. .................. 280/507 |
| 4,368,455 | A | * | 1/1983 | Menard ....................... 340/431 |
| 4,474,116 | A | * | 10/1984 | Castenada et al. ............ 109/51 |
| 4,524,904 | A | * | 6/1985 | Masse et al. .................. 232/7 |
| 4,573,332 | A |   | 3/1986 | Ma |
| 4,638,746 | A | * | 1/1987 | Ishigure ........................ 109/52 |
| 4,667,491 | A | * | 5/1987 | Lokken et al. ................. 70/63 |
| 4,669,281 | A | * | 6/1987 | Young ............................ 70/57 |
| 5,129,501 | A | * | 7/1992 | Halsey et al. ............... 194/350 |
| 5,488,914 | A | * | 2/1996 | Ouellette ..................... 109/56 |
| 2002/0148395 | A1 | * | 10/2002 | Judge .......................... 109/52 |
| 2004/0045329 | A1 | * | 3/2004 | Farnham et al. ............... 70/63 |

FOREIGN PATENT DOCUMENTS

GB 2345727 7/2000

* cited by examiner

*Primary Examiner*—Lloyd A. Gall
(74) *Attorney, Agent, or Firm*—WPAT, PC; Anthony King

(57) ABSTRACT

A security box includes an outer box, an inner box and a lock cable. The outer box comprises a compartment adapted to receive the inner box therein. The outer box further comprises a first lock hole. The inner box comprises a second lock hole, a lock core hole, a lock core and a sleeve. The sleeve has a first blind hole and a second blind hole corresponding to the second lock hole and the lock core hole respectively. The lock core has a blind hole corresponding to the first blind hole and the second lock hole. A lock cable has a lock rod at one end and a lock ring at the opposite end thereof. The lock rod is inserted through the first lock hole, the second lock hole, and the first blind hole to be secured in the blind hole of the lock core.

7 Claims, 5 Drawing Sheets

SECURITY BOX

BACKGROUND OF THE INVENTION

1. Field of the Invention

The present invention relates to a security box, in particular to a security box to be secured in a car, wherein an inner box is inserted into an outer box which can be locked at a distance place within the car.

2. Description of the Prior Art

A conventional portable security box, as disclosed in U.S. Pat. No. 4,573,332, comprises a container formed from a pair of mating sections and a lock carried by one of the sections and having a flexible cable extending therefrom. The other section defines an opening for accessing the lock when both sections are in a closed position. The other section also defines a pair of openings which align with openings in the first section when the sections are in the closed position. In this manner, the cable can extend from the lock carried by the one section, through the aligned openings, and back to the lock, to secure the sections in the closed position. The container is formed from a pair of plastic sections which are hinged together at an end opposite the end at which the lock is located. However, the cable needs to wind on a fixed device which is long enough only to wind a fixed place or object, thus the locked security box is disposed to the people who are passing by the car.

SUMMARY OF THE INVENTION

It is the primary advantage of the present invention to provide a security box, which can store valuable items therein to protect the items from being stolen.

It is another advantage of the present invention to provide a security box, which has a lock cable to extend the security box to a secret place, such as underneath the car seat or the trunk when it is locked in the car.

According to the present invention, there is provided a security box comprising an outer box, an inner box, and a lock cable. The outer box comprises a compartment and a first lock hole. The inner box accommodated in said compartment of said outer box comprises a second lock hole, a lock core hole, a lock core and a sleeve. Said sleeve comprises a first blind hole and a second blind hole. Said first blind hole corresponds to said second lock hole and said second blind hole corresponds to said lock core hole. Said lock core comprises a blind hole corresponding to said first blind hole and said second lock hole when said lock core is inserted in said sleeve. The lock cable comprises a lock rod at one end and a lock ring at the other end thereof. By inserting said lock rod through said first lock hole, said second lock hole, and said blind hole of said lock core, said lock cable is locked by said lock core.

Preferably said outer box is a piece of metal plate having mortises at one end and tenons at the other end, by bending the metal plate to make the two ends matching with each other and being welded together to form said compartment.

Preferably said inner box is provided with a handle at an outer side thereof.

Preferably said compartment of said outer box is provided with a stopper.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE PREFERRED EMBODIMENTS

Figure 1:
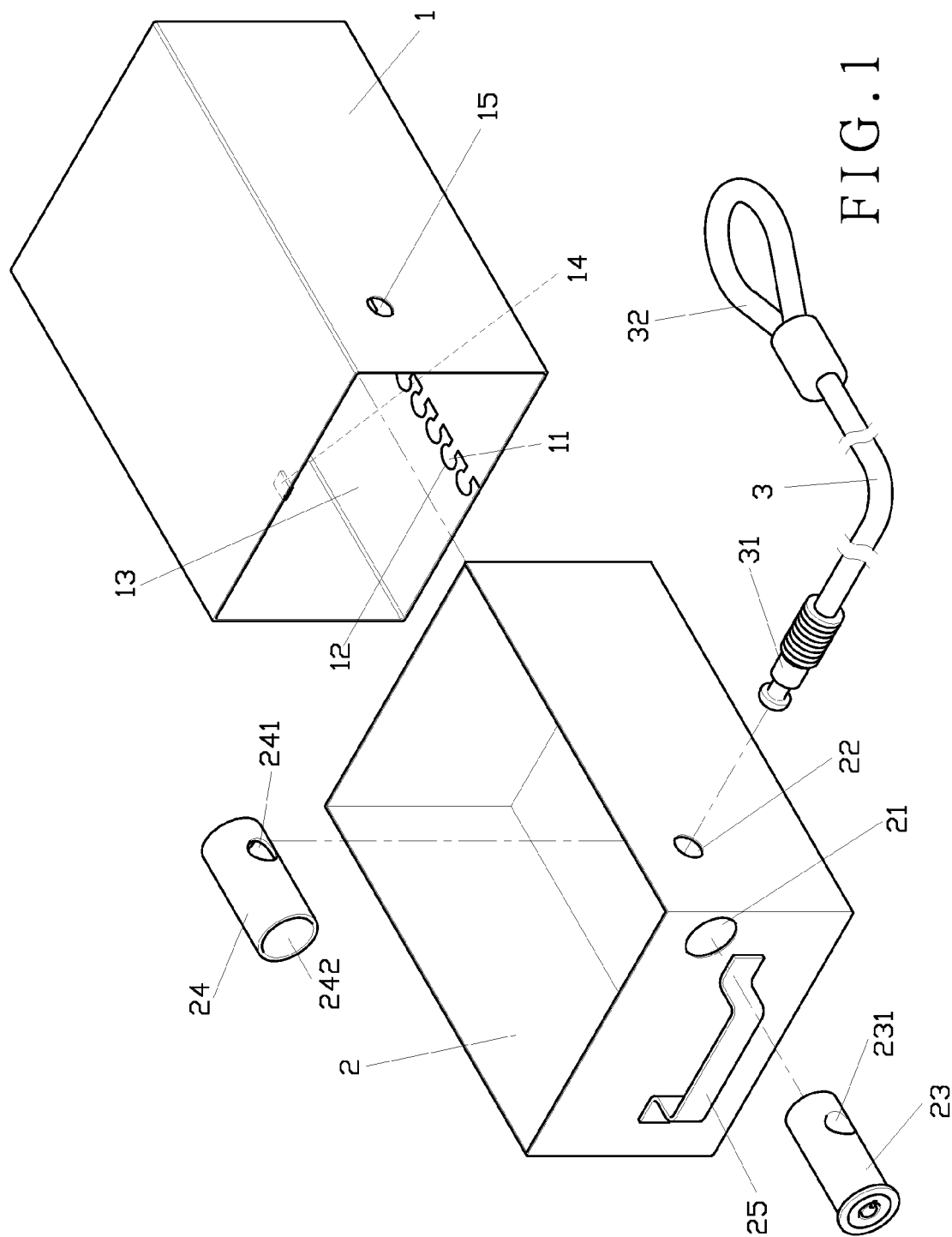
FIG. 1 is an exploded view of a first preferred embodiment of the present invention.

As shown in FIG. 1, a first embodiment of the present invention comprises an outer box 1, an inner box 2 and a lock cable 3.

The outer box 1 is a piece of metal plate having tenons 11 at one end and mortises 12 at the other end thereof, by bending the metal plate to force the mortises 12 matching with the tenons 11 and then welding together to form a seamless hollow box having a compartment 13 therein. The inner wall of the compartment 13 is provided with a stopper 14, and a first lock hole 15 is disposed on one side of the outer box 1.

The inner box 2 is accommodated in the compartment 13 of the outer box 1 and disposed with a lock core hole 21 and a second lock hole 22 corresponding to the first lock hole 15 when the inner box 2 is inserted into the outer box 1 at a secured place. The lock core hole 21 is adapted to receive a sleeve 24 therein. The sleeve 24 has a first blind hole 241 and a second blind hole 242 corresponding to the second lock hole 22 and the lock core hole 21, respectively. A lock core 23 is inserted into the sleeve 24 through the second blind hole 242 of the sleeve 24, and comprises a blind hole 231 corresponding to the first blind hole 241, the second lock hole 22 and the first lock hole 15. The inner box 2 further comprises a handle 25 to facilitate pulling and pushing of the inner box 2 from the outer box 1.

The lock cable 3 is a cable having two ends. One end is provided with a lock rod 31 and the other end is disposed with a lock ring 32.

Figure 2:
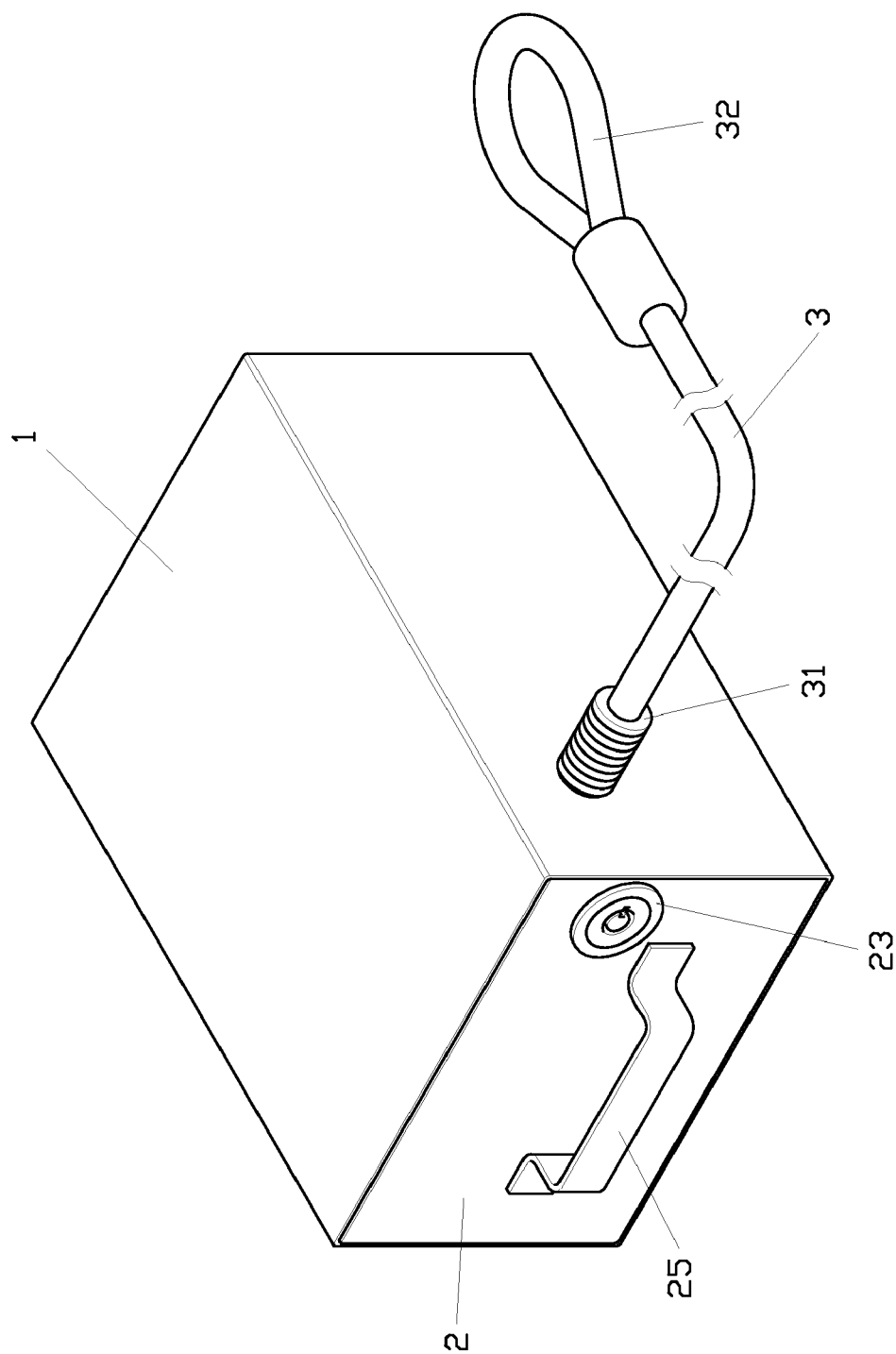
FIG. 2 is a perspective view of the first preferred embodiment of the present invention.

To assemble the present invention, as shown in FIG. 2, the lock core 23 is inserted into the sleeve 24 through the lock core hole 21. The blind hole 231 of the lock core 23 is aligned with the second lock hole 22. The inner box 2 is pushed into the compartment 13 of the outer box 1. The stopper 14 of the outer box 1 is to prevent the inner box 2 detaching from the outer box 1.

Figure 3:
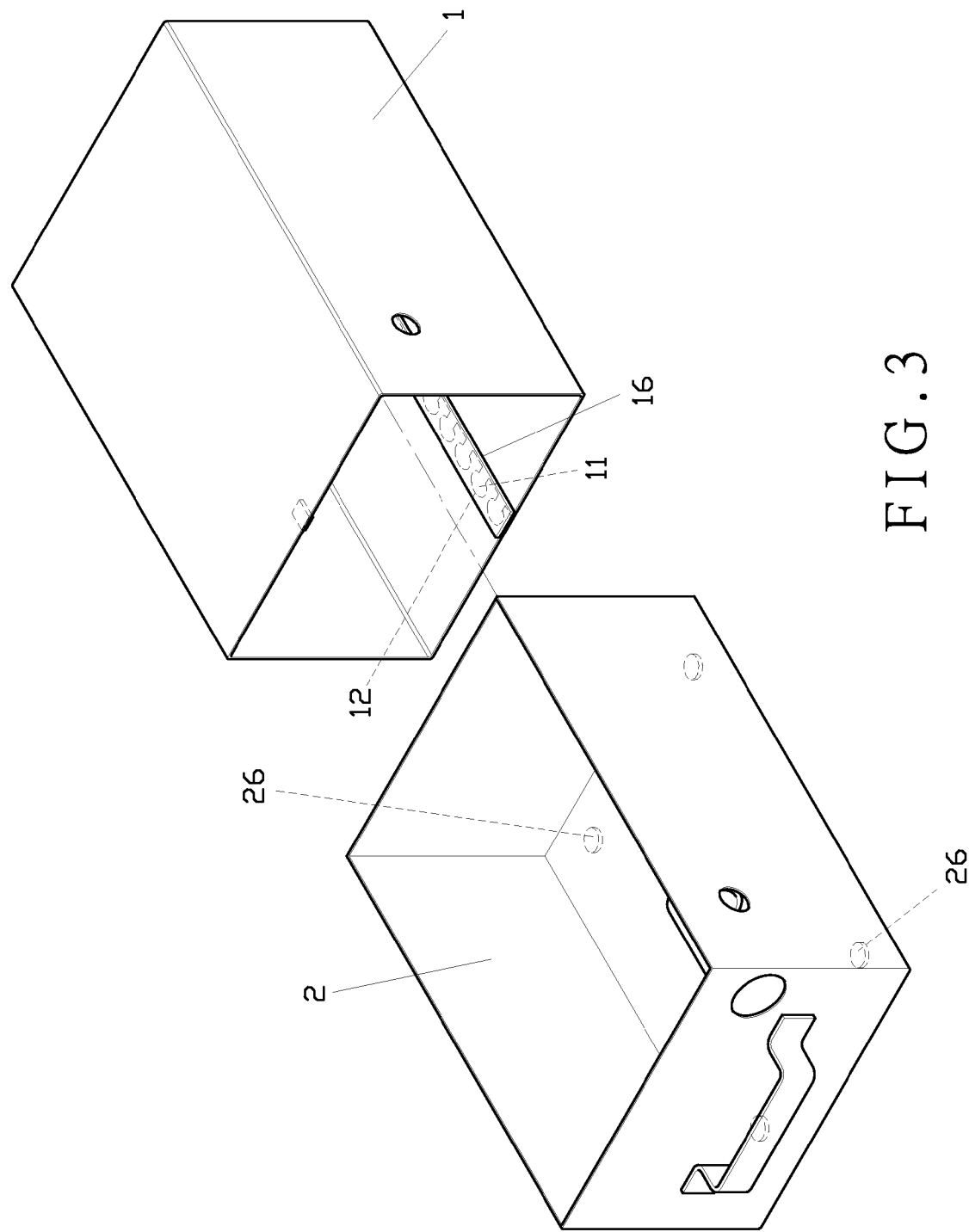
FIG. 3 is an exploded view of a second embodiment of the present invention.

FIG. 3 shows a second embodiment of the present invention, which comprises an outer box 1 having tenons 11 at one end and mortises 12 at the other end thereof to be welded to form a seamless connection. A reinforcing plate 16 is welded to the connecting area of the outer box 1. An inner box 2 is provided with protuberances 26 at the bottom portion thereof which are set in such a method that when the inner box 2 is pushed into the outer box 1, the protuberances 26 will engage with and slide through the reinforcing plate 16. This arrangement decreases friction when pulling or pushing the inner box 2 with respect to the outer box 1.

Figure 4:
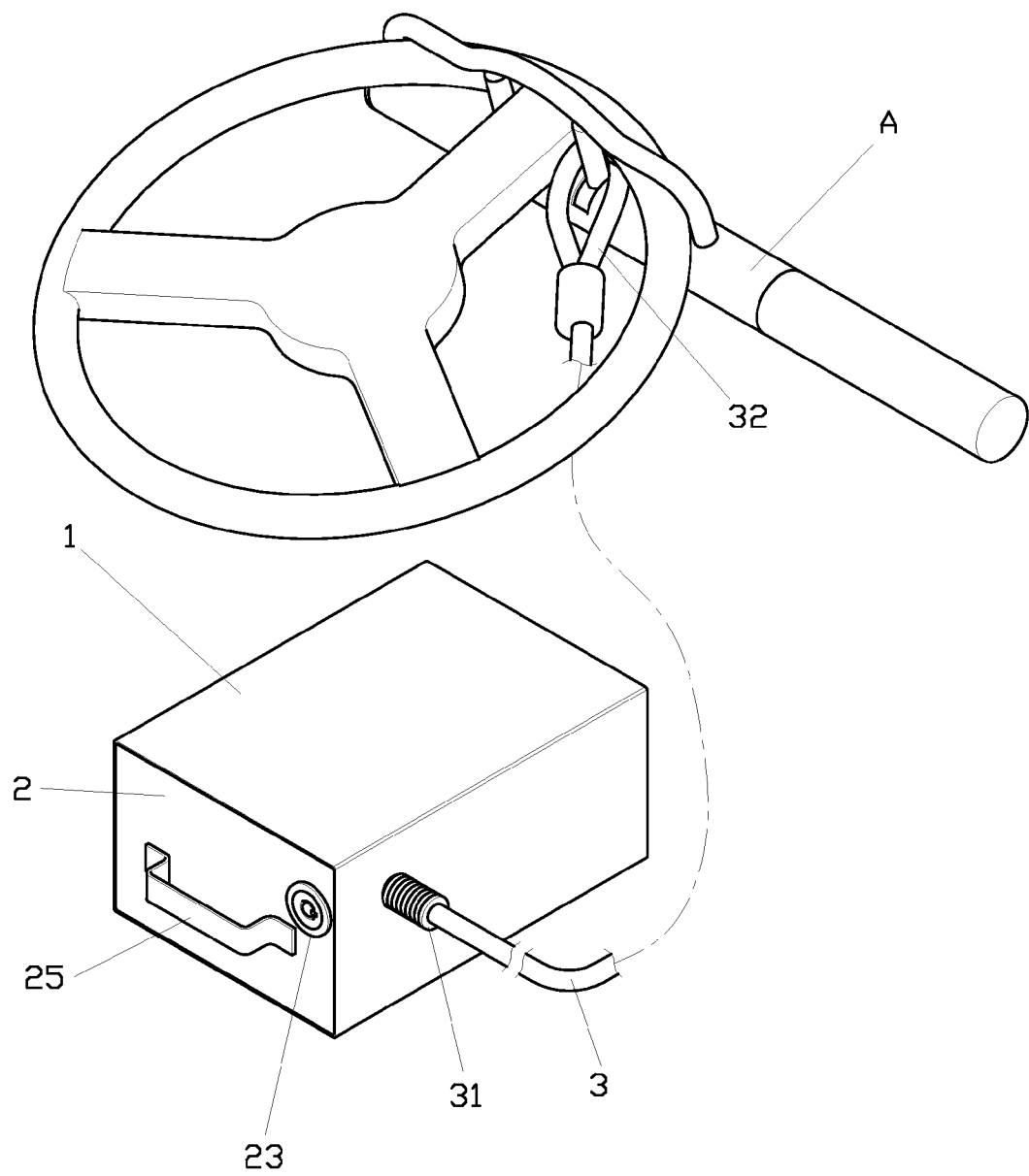
FIG. 4 is a perspective view showing the present invention secured to a steering wheel lock.

To use the present invention, as shown in FIG. 4 and FIG. 1, the handle 25 is grasped to pull the inner box 2 out of the outer box 1. When the inner box 2 reaches a predetermined position, the stopper 14 will block the inner box 2 from further pulling away and detaching from the outer box 1.

When the inner box 2 is secured in the outer box 1, the outer box 1 can be hidden at any corner or under the seat with the lock cable 3.

The lock cable 3 may be secured to a fixed place, such as a steering wheel, by connecting the lock ring 32 to a steering wheel lock A. The lock rod 31 of the lock cable 3 is inserted into the first lock hole 15, the second lock hole 22 and the blind hole 231 and then locked by the lock core 23.

Figure 5:
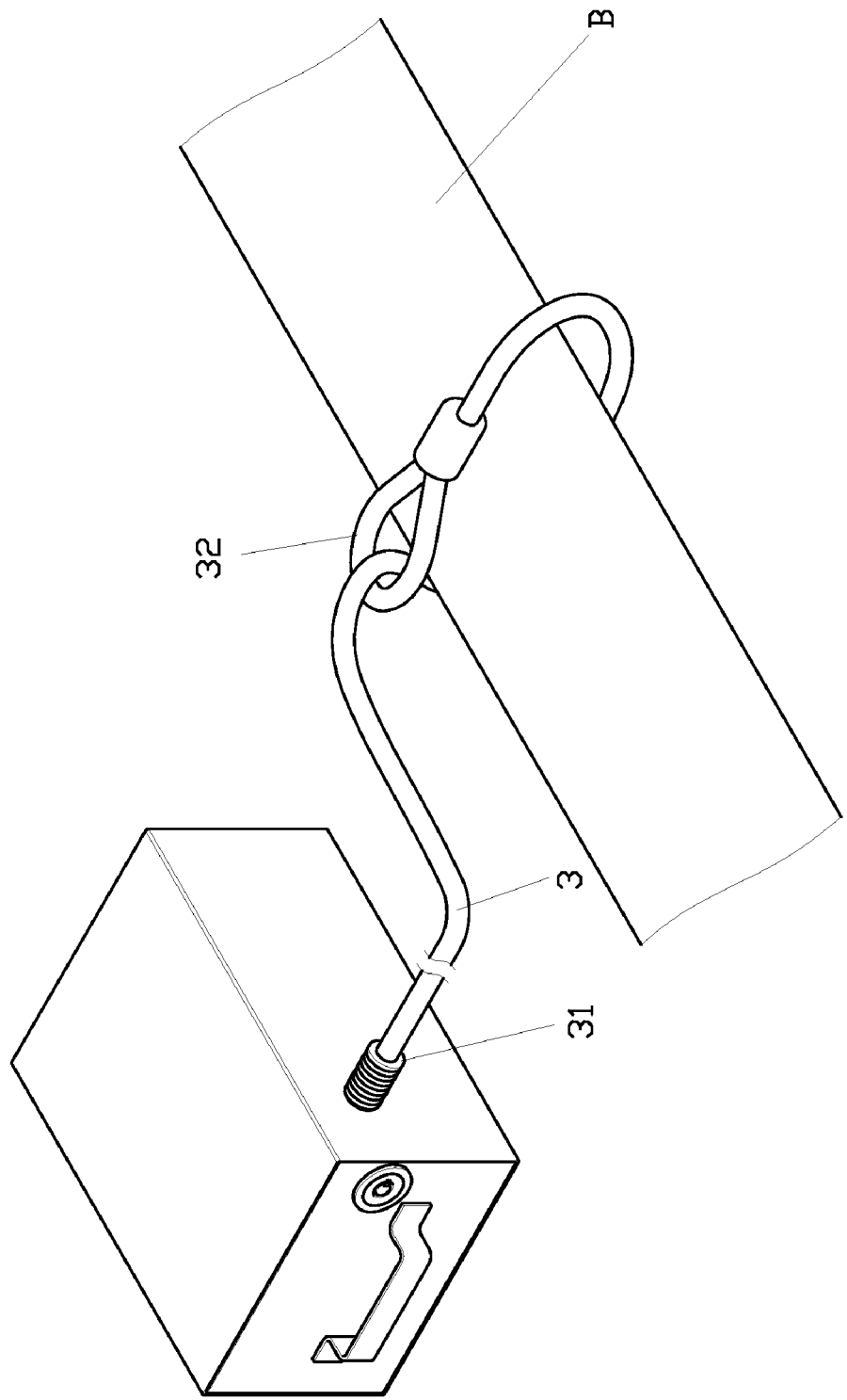
FIG. 5 is a perspective view showing the present invention secured to a fixed object.

When a user is located at a gym or other public places where there are no public security boxes provided, the lock rod 31 of the lock cable 3 may be winded around a rail or any other fixed posts B and then inserted through the lock ring 32 before inserting into the lock core 23 so as to secure the security box to the place, as shown in FIG. 5.

It is to be noted that the present invention is not limited to use with a vehicle, it may be applied to a storage room as a temporary lock box and be secured to a rail in a gym.

What is claimed is:

1. A security box, comprising:
    an outer box comprising a compartment and a first lock hole;
    an inner box accommodated in said compartment of said outer box comprising a second lock hole, a lock core hole, a lock core and a sleeve, said sleeve comprising a first blind hole and a second blind hole, said first blind hole corresponding to said second lock hole and said second blind hole corresponding to said lock core hole, said lock core comprising a blind hole corresponding to said first blind hole and said second lock hole when said lock core is inserted in said sleeve; and
    a lock cable comprising a lock rod at one end and a lock ring at the other end thereof;
    by inserting said lock rod through said first lock hole, said second lock hole, and said blind hole of said lock core, said lock cable being locked by said lock core.

2. The security box, as recited in claim 1, wherein said outer box is a piece of metal plate having mortises at one end and tenons at the other end, by bending the metal plate to make the two ends matching with each other and being welded together to form said compartment.

3. The security box, as recited in claim 1, wherein said inner box is provided with a handle at an outer side thereof.

4. The security box, as recited in claim 1, wherein said compartment of said outer box is provided with a stopper.

5. A security box, comprising:
    an outer box being a piece of metal plate having mortises at one end and tenons at the other end thereof, by bending the metal plate to make the two ends matching with each other and be welded together to form a compartment, said outer box comprising a first lock hole;
    an inner box accommodated in said outer box comprising a second lock hole, a lock core hole, a lock core and a sleeve, said sleeve comprising a first blind hole and a second blind hole, said first blind hole corresponding to said second lock hole and said second blind hole corresponding to said lock core hole, said lock core comprising a blind hole corresponding to said first blind hole and said second lock hole when said lock core is inserted into said sleeve; and
    a lock cable comprising a lock rod at one end and a lock ring at the other end thereof;
    by inserting said lock rod through said first lock hole, said second lock hole, and said blind hole of said lock core, said lock cable being locked by said lock core.

6. The security box, as recited in claim 5, wherein said inner box is provided with a handle at an outer side thereof.

7. The security box, as recited in claim 5, wherein said compartment of said outer box is provided with a stopper.

* * * * *